US011340955B2

(12) United States Patent
Mitra et al.

(10) Patent No.: US 11,340,955 B2
(45) Date of Patent: May 24, 2022

(54) THREAD POOL MANAGEMENT FOR MULTIPLE APPLICATIONS

(71) Applicant: International Business Machines Corporation, Armonk, NY (US)

(72) Inventors: Suman Mitra, Bangalore (IN); Gireesh Punathil, Kannur (IN); Vipin M V, Palakkad (IN)

(73) Assignee: International Business Machines Corporation, Armonk, NY (US)

( * ) Notice: Subject to any disclaimer, the term of this patent is extended or adjusted under 35 U.S.C. 154(b) by 217 days.

(21) Appl. No.: 16/732,495

(22) Filed: Jan. 2, 2020

(65) Prior Publication Data

US 2021/0208944 A1 Jul. 8, 2021

(51) Int. Cl.
*G06F 9/50* (2006.01)
*G06F 9/54* (2006.01)
*G06F 9/455* (2018.01)

(52) U.S. Cl.
CPC ............ *G06F 9/5055* (2013.01); *G06F 9/455* (2013.01); *G06F 9/54* (2013.01);
(Continued)

(58) Field of Classification Search
CPC .......... G06F 9/5055; G06F 9/455; G06F 9/54; G06F 2209/5011; G06F 2209/5018
See application file for complete search history.

(56) References Cited

U.S. PATENT DOCUMENTS 6,427,161 B1    7/2002   LiVecchi
6,427,195 B1 *   7/2002   McGowen ............ G06F 9/5016
                                                                            711/153

(Continued)

FOREIGN PATENT DOCUMENTS

CN    103810048 A    5/2014
CN    103268247 B    1/2017
(Continued)

OTHER PUBLICATIONS

QNX Neutrino Operating System Documentation QNX Software Systems Limited Selected portions from QNX® Software Development Platform 6.6; and QNX® CAR Platform for Infotainment 2.1 categories Retrieved from (top page): www.qnx.com/developers/docs/6.6.0.update/ (Year: 2018).*

(Continued)

*Primary Examiner* — Emerson C Puente
*Assistant Examiner* — Paul V Mills
(74) *Attorney, Agent, or Firm* — Nicholas D. Bowman

(57) ABSTRACT

Execution of varying tasks for heterogeneous applications running in a single runtime environment is managed. The runtime environment is capable of managing thread pools for any of the plurality of applications and receives a request to manage a thread pool for one of the applications. The request includes size thresholds for the pool, a first function to be invoked for creation of threads, and a second function to be invoked for termination of the threads. Responsive to detecting that a first size threshold is not satisfied, the runtime environment invokes the first function to cause the application to create an additional thread. Responsive to detecting that a second size threshold is not satisfied, the runtime environment places an artificial task that incorporates the second function into a work queue for the thread pool, whereby a thread executes the artificial task to invoke the second function and thereby terminates.

20 Claims, 6 Drawing Sheets

(52) U.S. Cl.
CPC .............. *G06F 2209/508* (2013.01); *G06F 2209/5011* (2013.01); *G06F 2209/5018* (2013.01)

(56) References Cited

U.S. PATENT DOCUMENTS

| | | | |
|---|---|---|---|
| 6,430,570 B1* | 8/2002 | Judge ................ | G06F 9/44594 |
| | | | 707/769 |
| 6,477,561 B1 | 11/2002 | Robsman | |
| 6,542,920 B1 | 4/2003 | Belkin et al. | |
| 6,633,923 B1 | 10/2003 | Kukura et al. | |
| 6,766,349 B1 | 7/2004 | Belkin | |
| 7,237,242 B2 | 6/2007 | Blythe et al. | |
| 9,910,711 B1 | 3/2018 | Ryoo et al. | |
| 10,061,619 B2 | 8/2018 | Necas | |
| 10,067,785 B1* | 9/2018 | Wei ................. | G06F 9/505 |
| 10,353,753 B1* | 7/2019 | Matylitski ............. | G06F 9/542 |
| 2004/0139434 A1* | 7/2004 | Blythe ................ | G06F 9/505 |
| | | | 718/100 |
| 2005/0183084 A1 | 8/2005 | Cuomo et al. | |
| 2008/0313637 A1 | 12/2008 | Youn et al. | |
| 2009/0019439 A1* | 1/2009 | Kwon ................ | G06F 9/5027 |
| | | | 718/100 |
| 2009/0070773 A1* | 3/2009 | Depoutovitch ....... | G06F 9/5027 |
| | | | 718/106 |
| 2009/0165016 A1 | 6/2009 | Bell, Jr. et al. | |
| 2009/0183167 A1 | 7/2009 | Kupferschmidt et al. | |
| 2012/0110581 A1* | 5/2012 | Watson ............... | G06F 9/485 |
| | | | 718/100 |
| 2016/0092263 A1* | 3/2016 | Gleyzer ............. | G06F 9/5083 |
| | | | 718/102 |
| 2019/0108057 A1* | 4/2019 | Wong ................ | G06F 9/48 |
| 2019/0129747 A1* | 5/2019 | Kim ................. | G06F 9/5038 |
| 2019/0188034 A1* | 6/2019 | Lloyd ............... | G06F 9/5061 |

FOREIGN PATENT DOCUMENTS

| | | |
|---|---|---|
| JP | 2017533502 A | 11/2017 |
| KR | 100586283 B1 | 5/2006 |
| KR | 101576628 B1 | 12/2015 |
| KR | 101839392 B1 | 3/2018 |
| WO | 2000058873 A1 | 10/2000 |
| WO | 2016048831 A1 | 3/2016 |

OTHER PUBLICATIONS

Smart Thread Pool Ami Bar Retrieved from: www.codeproject.com/Articles/7933/Smart-Thread-Pool (Year: 2012).*

Parallelism with Asynchronous Lambdas on Fiasco.OC/L4Re Jan Bierbaum Retrieved from: os.inf.tu-dresden.de/papers_ps/bierbaum-diplom.pdf (Year: 2013).*

Storing the state of an activity of your Android application Cindy Potvin Retrieved: www.javacodegeeks.com/2014/11/storing-the-state-of-an-activity-of-your-android-application.html (Year: 2014).*

Deval, G., "Why you probably don't need to tune the Open Liberty thread pool", Apr. 3, 2019, 4 pages <https://openliberty.io/blog/2019/04/03/liberty-threadpool-autotuning.html>.

Anonymous, "Thread Pool Executor Autonomies Improvement in the Liberty Application Server", An IP.com Prior Art Database Technical Disclosure, IP.com No. IPCOM000254623D, IP.com Electronic Publication Date: Jul. 17, 2018, 6 pages.

* cited by examiner

THREAD POOL MANAGEMENT FOR MULTIPLE APPLICATIONS

BACKGROUND

The present disclosure relates generally to the field of data processing, and, more particularly, to the management of thread pools for multiple applications by the runtime environment in which the applications run.

In computing, a task or work packet may refer to a data structure that contains code and data upon which the code operates. Tasks are typically simple enough that they can be picked up and executed efficiently by any of a number of different threads in an interchangeable manner. Tasks may include indicators for where the specific code that an executing thread is to operate on is located within the whole code of the applicable application. A thread pool may refer to the collection of threads that are used by an application to execute more than one of the application's tasks concurrently.

SUMMARY

Embodiments of the present disclosure include a method for managing execution of varying tasks for a plurality of heterogeneous applications running in a single runtime environment capable of managing thread pools for any of the plurality of applications. As part of the method, the runtime environment receives a request to manage a thread pool for one of the applications. The management request includes size thresholds for the thread pool, a first function to be invoked for creation of threads in the thread pool, and a second function to be invoked for termination of the threads in the thread pool. The method further includes, responsive to detecting that a first of the thread pool size thresholds is not satisfied, the runtime environment invoking the first function to cause the application to create an additional thread for the thread pool. The method further includes responsive to detecting that a second of the thread pool size thresholds is not satisfied, the runtime environment placing an artificial task that incorporates the second function into a work queue for the thread pool, whereby a thread in the thread pool executes the artificial task to invoke the second function and thereby terminates.

Embodiments of the present disclosure further include a computer program product for managing execution of varying tasks for a plurality of heterogeneous applications running in a single runtime environment capable of managing thread pools for any of the plurality of applications. The computer program product comprises a computer readable storage medium. The computer readable storage medium has program instructions embodied therewith that are configured, when executed by at least one computer, to cause the at least one computer to perform a method. As part of the method, the runtime environment receives a request to manage a thread pool for one of the applications. The management request includes size thresholds for the thread pool, a first function to be invoked for creation of threads in the thread pool, and a second function to be invoked for termination of the threads in the thread pool. The method further includes, responsive to detecting that a first of the thread pool size thresholds is not satisfied, the runtime environment invoking the first function to cause the application to create an additional thread for the thread pool. The method further includes responsive to detecting that a second of the thread pool size thresholds is not satisfied, the runtime environment placing an artificial task that incorporates the second function into a work queue for the thread pool, whereby a thread in the thread pool executes the artificial task to invoke the second function and thereby terminates.

Embodiments of the present disclosure further include a system for managing execution of varying tasks for a plurality of heterogeneous applications running in a single runtime environment capable of managing thread pools for any of the plurality of applications. The system includes a computer readable storage medium and a processor in communication with the computer readable storage medium. The processor is configured to obtain instructions from the computer readable storage medium that cause the processor to perform a method. As part of the method, the runtime environment receives a request to manage a thread pool for one of the applications. The management request includes size thresholds for the thread pool, a first function to be invoked for creation of threads in the thread pool, and a second function to be invoked for termination of the threads in the thread pool. The method further includes, responsive to detecting that a first of the thread pool size thresholds is not satisfied, the runtime environment invoking the first function to cause the application to create an additional thread for the thread pool. The method further includes responsive to detecting that a second of the thread pool size thresholds is not satisfied, the runtime environment placing an artificial task that incorporates the second function into a work queue for the thread pool, whereby a thread in the thread pool executes the artificial task to invoke the second function and thereby terminates.

The above summary is not intended to describe each illustrated embodiment or every implementation of the present disclosure.

BRIEF DESCRIPTION OF THE DRAWINGS

The drawings included in the present disclosure are incorporated into, and form part of, the specification. They illustrate embodiments of the present disclosure and, along with the description, serve to explain the principles of the disclosure. The drawings are only illustrative of typical embodiments and do not limit the disclosure.

Figure 1:
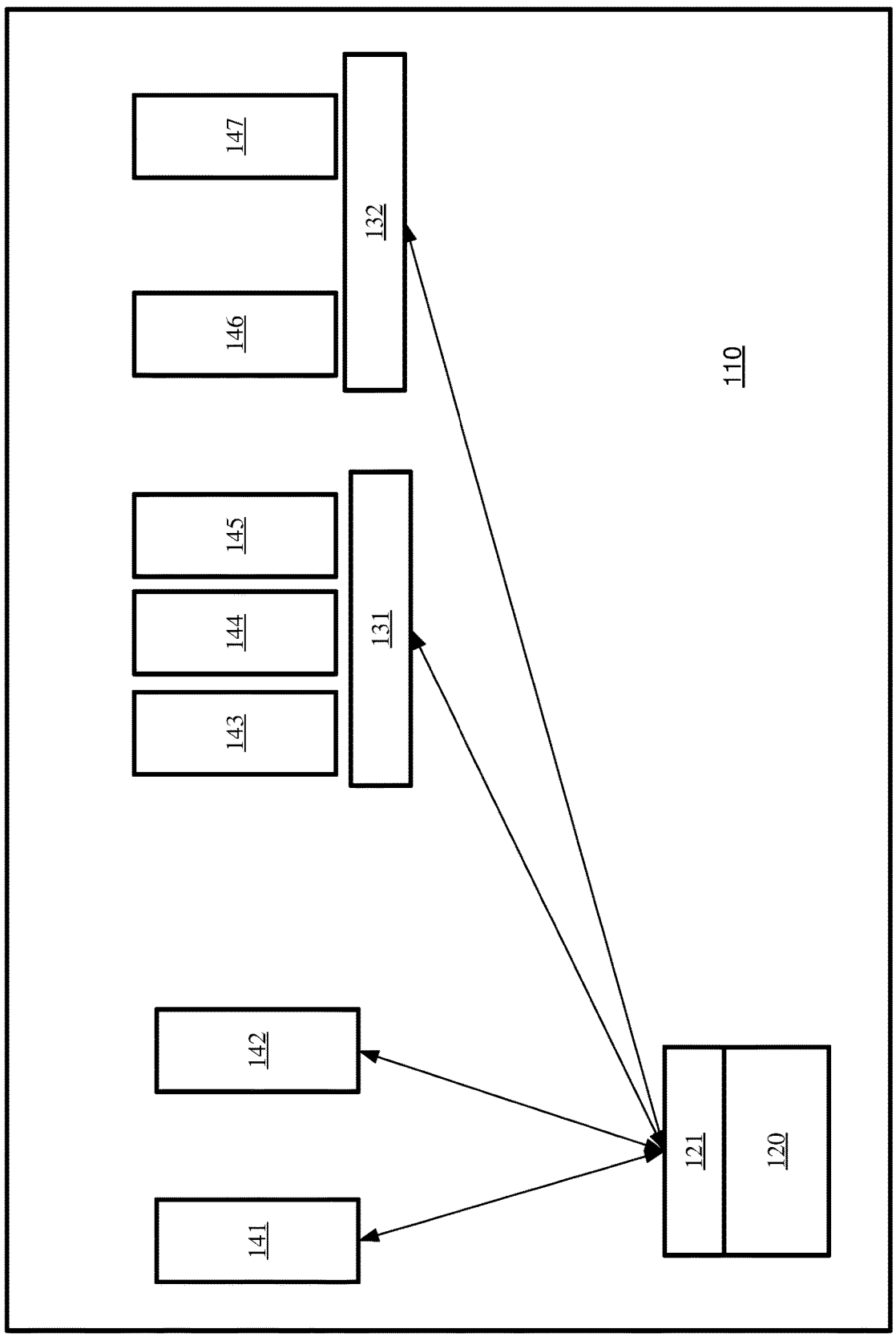
FIG. 1 illustrates a block diagram of an example runtime environment 110 incorporating a generic service 120 for managing thread pools for multiple applications, in accordance with embodiments of the present disclosure.

While the embodiments described herein are amenable to various modifications and alternative forms, specifics thereof have been shown by way of example in the drawings and will be described in detail. It should be understood, however, that the particular embodiments described are not to be taken in a limiting sense. On the contrary, the intention is to cover all modifications, equivalents, and alternatives falling within the spirit and scope of the invention.

DETAILED DESCRIPTION

Aspects of the present disclosure relate generally to the field of data processing, and, more particularly, to the management of thread pools for multiple applications by the runtime environment in which the applications run. While the present disclosure is not necessarily limited to such applications, various aspects of the disclosure may be appreciated through a discussion of various examples using this context.

Thread pools are extremely valuable for the management of concurrent task execution by applications. The pooling of threads improves an application's efficiency and responsiveness. However, one difficulty with thread pools lies in the need to properly balance the number of threads in the pool at any given time. In general, there will be no single default number of threads that will always be optimal for an application, as the application's workloads are likely to vary, in both type and quantity, over time. The consequences of having an incorrect number of threads in a thread pool can be significant: too few threads is an underutilization resources that can waste crucial time to task completion, but too many threads can overwork memory and cause errors in the application's execution. For example, an excessive number of idle threads can be a waste of memory, as each idle thread will have its own associated memory used (e.g., in terms of thread context, thread stack, thread-referenced objects, local thread storage). Thus, careful management of thread pool size is important.

In some situations, an application can manage the size of its own thread pool. This can be effective; however, it can also be inefficient, especially when multiple applications running in the same runtime environment are all using their resources trying to solve the same size management problem in a redundant manner.

Some embodiments of the disclosure may overcome these challenges by using a Transparent Thread Pool Manager (TTPM). As used herein, a TTPM refers to a thread pool management capability that is built into the hosting runtime environment itself (e.g., the virtual machine or language runtime that hosts the applications). This capability creates efficiencies by allowing the applications to offload responsibility for managing the size of thread pools onto the hosting environment (specifically, the TTPM) thereby promoting more efficient resource utilization. In embodiments, the TTPM acts as a transparent, specialized, and generic service or functionality of the hosting runtime environment. That is to say, it is transparent in the sense that the applications relying on it are largely agnostic as to how it functions; it is specialized in that it is generally only used for the very specific purpose of managing thread pool sizes; and it is generic in that it can be used by many (or all) of a variety of different, heterogenous applications that are running in the runtime environment.

In some embodiments, the TTPM works by exposing an interface to the applications running in the host environment, and then receiving, via the interface, thread pool management requests from the applications. These requests allow the TTPM to manage the life cycles of applicable threads by generally following a common format and providing the TTPM with the information about the tasks (and work queues) that each application needs its respective thread pool to support. This information provided by the requesting application to the TTPM can include size thresholds for the number of threads that are to be maintained in each application's respective pool. The information can further include contextual functions that provide the TTPM with code necessary to invoke the creation and termination of threads for a given application. The TTPM then monitors the thread pools at regular intervals and uses the contextual functions to modify the number of threads in each pool as applicable (e.g., by increasing the number of threads when a work queue backlog becomes too long or by decreasing the number of threads when an excessive number of threads are idle).

In some embodiments, the contextual functions provided to the TTPM in a thread management request include information sufficient for the TTPM to call the appropriate portions of code within the context of the requesting application that are necessary for thread creation and termination in the application's pool. These contextual functions may take the form of an entry lambda (for thread creation) and an exit lambda (for thread termination). In some embodiments, the passing of these lambdas with the management requests may be significant in keeping the TTPM an efficient and lightweight functionality. Specifically, because of the different contexts and workloads of the applications that the TTPM can support, the TTPM may need to be able to use entry and exit functions that are not the same or interchangeable across the various applications.

In some embodiments, when a TTPM detects that the workload in a particular work queue is above a desired threshold, the TTPM invokes the applicable entry lambda to have an additional thread created and registered to the pool. Conversely, when the TTPM detects an excessive number of idle threads, the TTPM inserts the applicable exit lambda into an artificial task and places the artificial task in the applicable work queue. The artificial task is then executed by one of the threads in the pool, which causes that thread to terminate.

In further embodiments, the exit lambda may cause a thread which executes it to create a state representation of itself before it terminates. Specifically, the exit routine executed by the thread may cause the creation of an object representing the state information of the thread immediately prior to its exit sequence. This state representation may then be stored in a local storage (e.g., cache) of the TTPM itself. Later, when the TTPM needs to create a new thread for the same pool, the TTPM can obtain that state representation from the local storage and provide it as an input (e.g., an input object) to the applicable entry lambda so that the destroyed thread can be recreated using that context. Embodiments employing this approach may offer significant advantages, particularly in instances where a significant amount of contextual information is needed to create a thread. Specifically, by storing the state representation locally, the recreation of the thread may take less processor power than recreating the thread by going back to the requesting application to get (or regenerate) that context information. For example, the caching of this state representation may be valuable in a situation where executing a large static block of code is a pre-requisite for bringing a particular thread into (or back into) a pool. This way the large block of code does not need to be re-executed every time a thread is created for the pool; rather, the block can be executed once, and the context can be saved for use in (re)creating future threads (with less processing power).

Referring now to the figures, shown in FIG. 1 is a block diagram of an example runtime environment 110 incorporating a generic service 120 for managing thread pools for multiple applications, in accordance with embodiments. As shown, the applications 131, 132, and 141-147 are running in the single runtime environment 110 (which may, in turn, be executing on one or more processors, such as CPUs 602A, 602B, 602C, and 602D of computer system 601 of FIG. 6). In some embodiments, the runtime environment 110 is a virtual machine. The hosted applications include both applications 141, 142, 131, and 132 that interact directly with an application programming interface (API) 121 of the generic service (e.g., TTPM) 120 and applications 143-147 that interact with the API 121 through middleware applications (i.e., middleware components) 131 and 132.

The applications 131, 132, and 141-147 may include a wide variety of applications that may be of the same or different types of applications as each other and may execute a wide variety of tasks. For example, runtime environment 110 could be a cloud hosting environment for a banking institution, wherein the applications 141 and 142 are different end user applications both designed to provide user interface services for the bank's customers, the applications 143-145 are separate instances of identical security applications designed to protect access to the bank's records, and the applications 146 and 147 are related invoicing applications designed to help the bank manage its account payables. Further, given the differences among these applications, it would be expected that they could: (i) need to execute tasks that vary significantly among the applications (e.g., a security application will likely execute tasks that are very different from the tasks executed by an invoicing application) and (ii) have workloads that fluctuate on very different time schedules (e.g., with security being needed all the time and invoicing being done mainly during work hours).

In some embodiments, the generic service 120 is a functionality of the runtime environment 110 that communicates with the applications 131, 132, and 141-147 through the API 121. By exposing the generic service 120 through the API 121, the runtime environment 110 may offer a simple, stateless communication path through which the generic service 120 can communicate in a series of calls (in a standardized format) with any or all of the applications 131, 132, and 141-147. Given its generic nature, the generic service 120 may be able to use these call sequences to efficiently handle thread pool size management requests for these applications 131, 132, and 141-147 and handle thread pool management for multiple applications 131, 132, and 141-147 concurrently.

Figure 2:
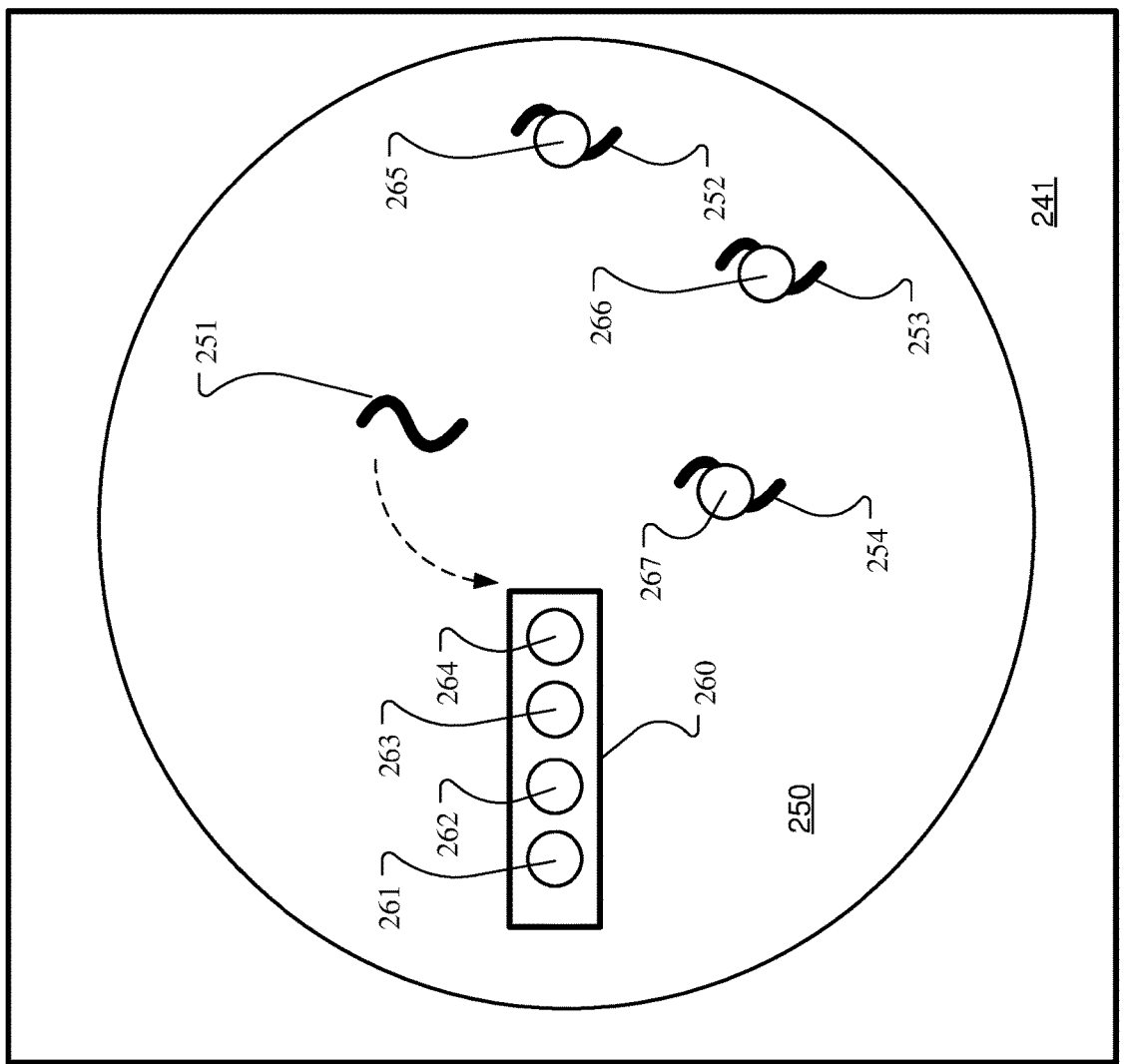
FIG. 2 illustrates a block diagram of an example thread pool 250 of application 241 managed by a generic service 220, in accordance with embodiments of the present disclosure.
Figure 2:
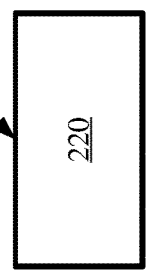

Referring now to FIG. 2, shown is a block diagram of an example thread pool 250 for application 241 managed by a generic service 220, in accordance with embodiments. In some embodiments, application 241 and generic service 220 may be the same as, or substantially similar to, application 141 and generic service 120 of FIG. 1, respectively. As shown, the thread pool 250 has a work queue 260 that includes a plurality of tasks 261-264 that are awaiting execution by any of the threads 251-254. The tasks 261-264 may include a wide variety of tasks that need to be completed for application 241. For example, task 261 could include instructions to read a file, parse the content, and provide a specific field value. For another example, task 262 could include instructions to connect to a cloud service, obtain a result, and return the result. For yet another example, task 263 could include instructions to connect to a database, fetch a few records, and compute an aggregation of those records.

As further shown, the threads 252, 253, and 254 are currently executing tasks 265, 266, and 267, respectively. In addition, thread 251, having completed its last task, is obtaining a new task 264 from the front of the work queue 260.

In embodiments, the generic service 220 monitors the thread pool 250 to make sure that the number of threads in the thread pool 250 remains appropriate given the number of tasks waiting in the work queue 260. If the generic service 220 detects an insufficient number of threads, then it can invoke an entry lambda specific to the application 241 to cause one or more additional threads to be created by the application 241 and added to the thread pool 250. Conversely, if the generic service detects an excessive number of threads, then it can place an artificial task incorporating an exit lambda specific to application 241 into the work queue 260, such that a thread in the thread pool 250 executes the artificial task and terminates.

Figure 3:
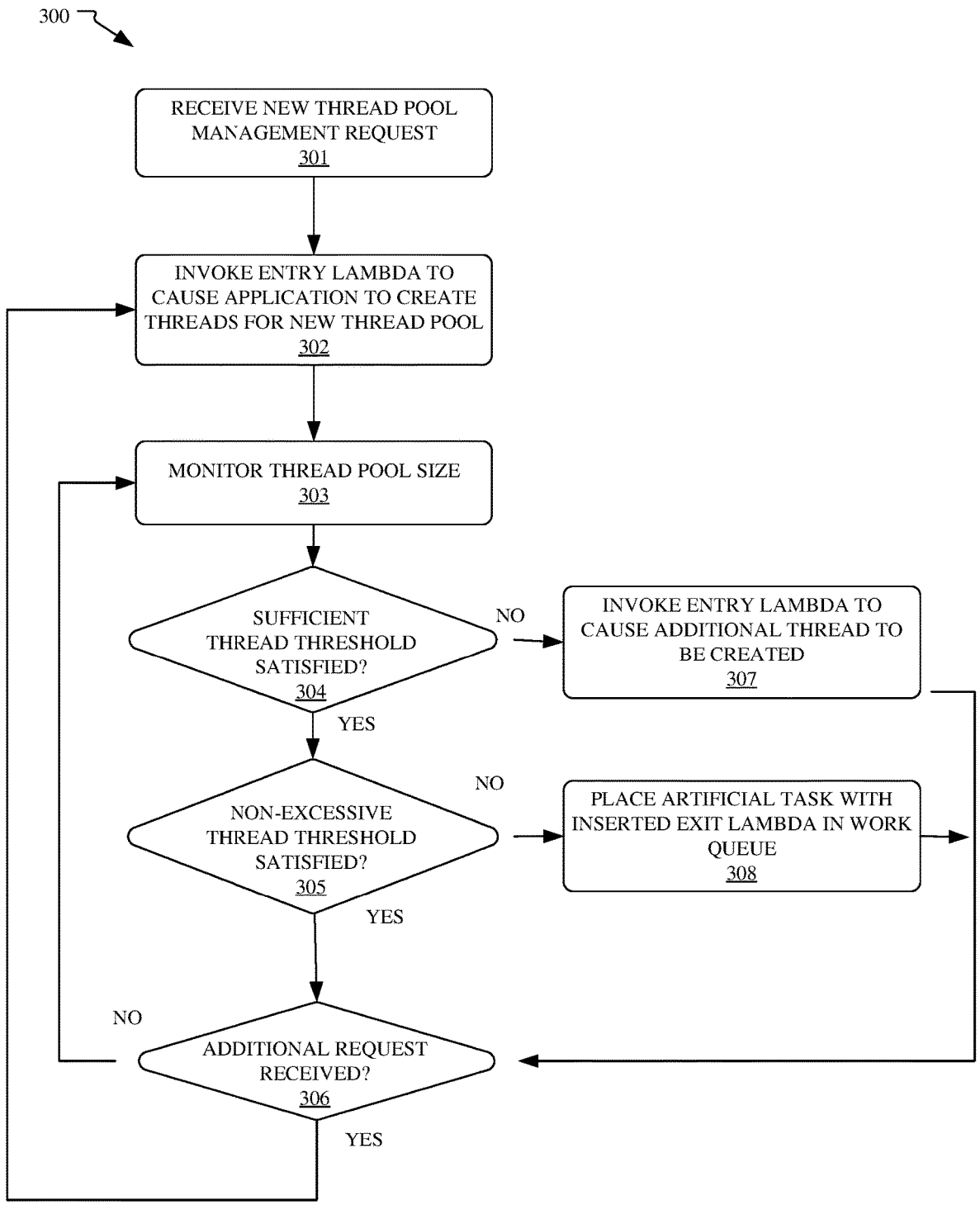
FIG. 3 illustrates a flow diagram of a method 300 for managing thread pools by a runtime environment, in accordance with embodiments of the present disclosure.

Referring now to FIG. 3, shown is a flow diagram of a method 300 for managing thread pools by a runtime environment, in accordance with embodiments. In some embodiments, operations of the method 300 may be performed on a processor of a computer (e.g., computer system 601 of FIG. 6). Further, in some embodiments, the operations of method 300 may be carried out via a generic service (e.g., TTPM) that is a functionality or aspect of the runtime environment itself (e.g., generic service 220 of FIG. 2).

The method 300 begins at operation 301, wherein a new thread pool management request from an application is received by the generic service. In some embodiments, the request may be received via an API exposed by the generic service. Further, in some embodiments, the request may be received through the API either directly from the application having the thread pool to be managed or indirectly (e.g., where the requesting application has its management request made via a middleware component upon which the application operates).

Further, the request may include information necessary for the generic service to effectively manage the thread pool for the application. This information may include a set of size thresholds for the thread pool and a set of functions to be invoked by the generic service for the creation and destruction of threads as adjustments in the size of the thread pool become necessary. In some embodiments, the request may further include a definition of the task list (work queue) upon which the relevant pooled threads operate and a count field that can be used by the generic service to compute the number of tasks currently waiting in the queue at any given time. Embodiments incorporating the count field as an attribute of the management request can save the generic service from having to enumerate over the tasks in the work queue to get the count for itself.

In an example, the management request from the application may use a standardized format of "void manageThreadPool(Object_work_queue_, int lower_threshold_, int upper_threshold_, void onEntry, void onExit)". In this example, the work_queue_ defines the relevant work queue for the request.

The lower_threshold_ defines the lower threshold for the thread pool (e.g., the desired number of threads in the thread pool when the requesting application is idle). If this lower threshold is set to zero, then all of the inactive threads will be terminated when detected by the generic service. If, however the lower threshold is set to a number other than zero, the generic service will maintain as many threads in the thread pool when the application is idle.

The upper_threshold_ defines the upper threshold for the number of tasks waiting in the work queue (e.g., the desired maximum number of tasks waiting in the work queue when the requesting application is active). If the number of tasks in the work queue exceeds the upper threshold, then the generic service will create new threads to meet the extra demand until the work queue is settled.

The onExit is the contextual function that the generic service can use to decrease the number of idle threads in the thread pool during thread pool size management. This occurs, for example, when the lower_threshold_ is exceeded. This contextual function is also referred to as an Exit Lambda herein and may cause the thread that executes it to perform a corresponding exit routine (e.g., by executing the contained or referenced thread termination code).

The onEntry is the second contextual function that the generic service can use to increase the size off the thread pool during thread pool size management. This occurs, for example, when the upper_threshold_ is exceeded. This contextual function is also referred to as an Entry Lambda herein and may contain or reference thread creation code.

In some embodiments, the use of contextual functions herein allows the generic service to invoke thread creation/destruction without having to manage the underlying implementation detail, which may be better handled by the applicable application itself. This means, however, that in many instances the contextual functions are specific to their associated applications and are not interchangeable between applications (e.g., one application's exit lambda cannot be used to cause another application's thread to terminate).

Next, per operation 302, the generic service invokes the entry lambda to cause the requesting application to create threads for the new thread pool. Per operation 303, the generic service then monitors the thread pool size to make sure that the number of threads in the pool stays within the desired bounds. As part of this monitoring, and per operation 304, the generic service determines whether there is an insufficient number of threads in the thread pool. In some embodiments, this involves determining whether a sufficient thread threshold is satisfied. This determination may be made a number of ways. For example, if the generic service counts the number of tasks awaiting execution in the work queue (e.g., using the count field described above or other means) and determines that there is more tasks waiting than desirable (e.g., where the upper_threshold_ described above is exceeded), then there is a determination that the sufficient thread threshold is not satisfied. Conversely, if the generic service counts the number of tasks awaiting execution in the work queue and determines that there are not more tasks waiting than desirable (e.g., where the upper_threshold_ described above is not exceeded), then there is a determination that the sufficient thread threshold is satisfied.

If, in operation 304, there is a determination that the sufficient thread threshold is not satisfied (i.e., there is an insufficient number of threads), then, per operation 307, the generic service invokes the entry lambda to cause one or more additional threads to be created in the thread pool so that the sufficient thread threshold is satisfied. In some embodiments, this may involve the crafting a stack for a new thread's context, creating the new thread from the context, and driving/registering the new thread to the thread pool.

The generic service then proceeds to operation 306. However, if, in operation 304, there is a determination that the sufficient thread threshold is satisfied (i.e., there is a sufficient number of threads), then the generic service proceeds to operation 305.

As a further part of the monitoring, and per operation 305, the generic service determines whether there is an excessive number of threads in the thread pool. In some embodiments, this involves determining whether a non-excessive thread threshold is satisfied. This determination may be made a number of ways. For example, if the generic service counts the number of threads waiting idle while the application is in an idle state and determines that there are more idle threads than desirable (e.g., where the lower_threshold_ described above is exceeded), then there is a determination that the non-excessive thread threshold is not satisfied. Conversely, if the generic service counts the number threads waiting idle while the application is in an idle state and determines that there are not more threads than desirable, then there is a determination that the non-excessive thread threshold is satisfied.

If, in operation 305, there is a determination that the non-excessive thread threshold is not satisfied (i.e., there is an excessive number of threads), then, per operation 308, the generic service places (e.g., inserts) one or more artificial tasks with the exit lambda into the work queue for execution by one or more of the threads to cause the one or more threads to terminate so that the non-excessive thread threshold is satisfied. In some embodiments, this may involve identifying an idle thread's stack context and then using the artificial task as a way to force the idle thread to break its wait state and execute predefined exit code (as defined by the exit lambda) to lead to thread termination. In some embodiments, the artificial task will be structurally the same as the regular tasks, with the difference being that the artificial task contains work in the form the of the exit code. This makes sense in that an artificial task that is not the same as the regular tasks for an application would likely not be executable by the application's threads.

The generic service then proceeds to operation 306. However, if, in operation 305, there is a determination that the non-excessive thread threshold is satisfied (i.e., there is not an excessive number of threads), then the generic service proceeds to operation 306 without performing operation 308.

Per operation 306, the generic service determines whether additional thread pool management requests have been received (e.g., from other applications in the same runtime environment). If not, then the generic service returns to operation 303 and continues to monitor the size of the existing thread pool(s). If, however, an additional request is received in operation 306, then the generic service returns to operation 302 to invoke the entry lambda from the new thread pool management request to create the new thread pool. Once multiple thread pools have been created for multiple applications, respectively, the generic service continues to monitor the sizes of each of these pools concurrently.

In some embodiments, the monitoring of the thread pool size described above may be carried out using a sampler of the generic service. One function of the sampler is to start up at regular intervals, examine the number active and inactive threads in the pool, and compare a count of the number of idle threads to the applicable threshold to determine whether one or more of the idle threads needs to be terminated. Another function of the sampler is to start up at regular intervals, examine the task backlog in the work queue, and compare a count of the number backlogged tasks to the applicable threshold to determine whether one or more additional threads need to be created.

Figure 4:
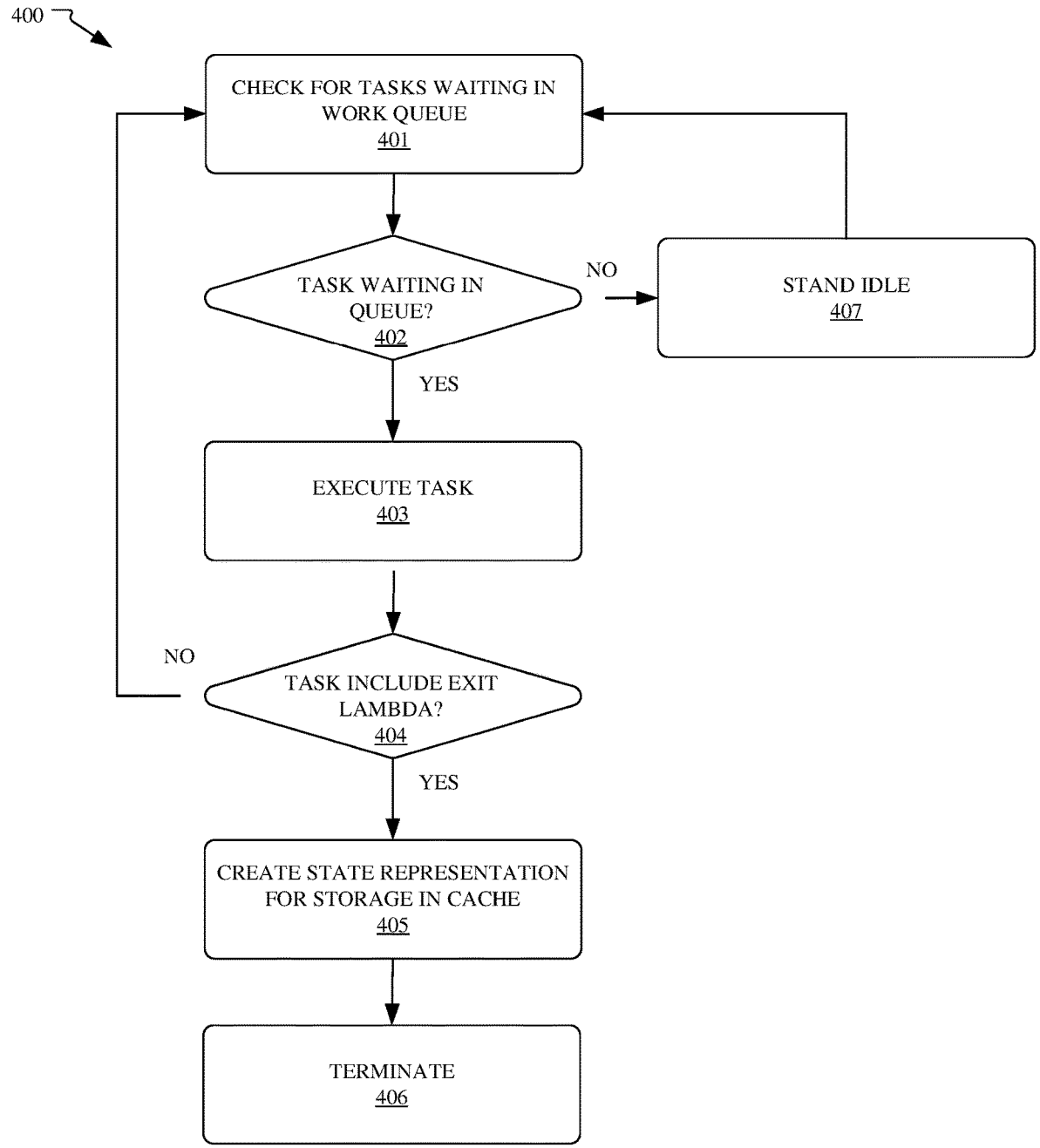
FIG. 4 illustrates a flow diagram of a method 400 for terminating a thread in a thread pool, in accordance with embodiments of the present disclosure.

Referring now to FIG. 4, shown is a flow diagram of a method 400 for terminating a thread in a thread pool, in accordance with embodiments. In some embodiments, operations of the method 400 may be performed by on a processor of a computer (e.g., computer system 601 of FIG. 6). Further, in some embodiments, the operations of method 400 may be carried out by a thread operating in a thread pool (e.g., thread 251 in thread pool 250 of FIG. 2). The method 400 begins at operation 401, wherein the thread checks for a next task waiting in a work queue. If, per operation 402, the thread determines that the there are no tasks waiting in the queue, then the thread proceeds to operation 407, wherein the thread stands idle for a time, and then checks the queue for waiting tasks (per operation 401) again.

However, if the thread determines, per operation 402, that there is a task awaiting execution in the work queue, then the thread executes the task, per operation 403. Per decision block 404, if the executed task does not incorporate an exit lambda, then the thread completes execution of the task and returns to operation 401 to check for additional tasks waiting in the work queue. However, if, per decision block 404, the executed task does include an exit lambda, then the thread creates a state representation of itself for storage in cache (e.g., a cache of the generic service), per operation 405, and terminates itself, per operation 406, in accordance with the exit lambda's code. In some embodiments, the types of state representation stored for the thread may include the thread's local data, cache, class loader information, and CPU affinity.

While an example embodiment of method 400 is described herein, it is contemplated that many variants of this method may be possible. For example, in some embodiments, the operation 405 is excluded, such that the thread's invocation of the exit lambda causes the thread to terminate without creating a state representation of itself. This may be useful, for example, in situations where the thread's context is very simple or easily obtained from the application, such that there would not be significant benefit to using that cached state to recreate the terminated thread at a later time. This makes sense given that pooled threads do not typically retain any state information or contextual data pertinent to an application other than the identity of the pool itself. Accordingly, in embodiments, a static code that is capable of driving thread creation and forcing it to wait upon the pool may be sufficient, and no thread specific data need be stored at thread exit or retrieved at thread entry.

Figure 5:
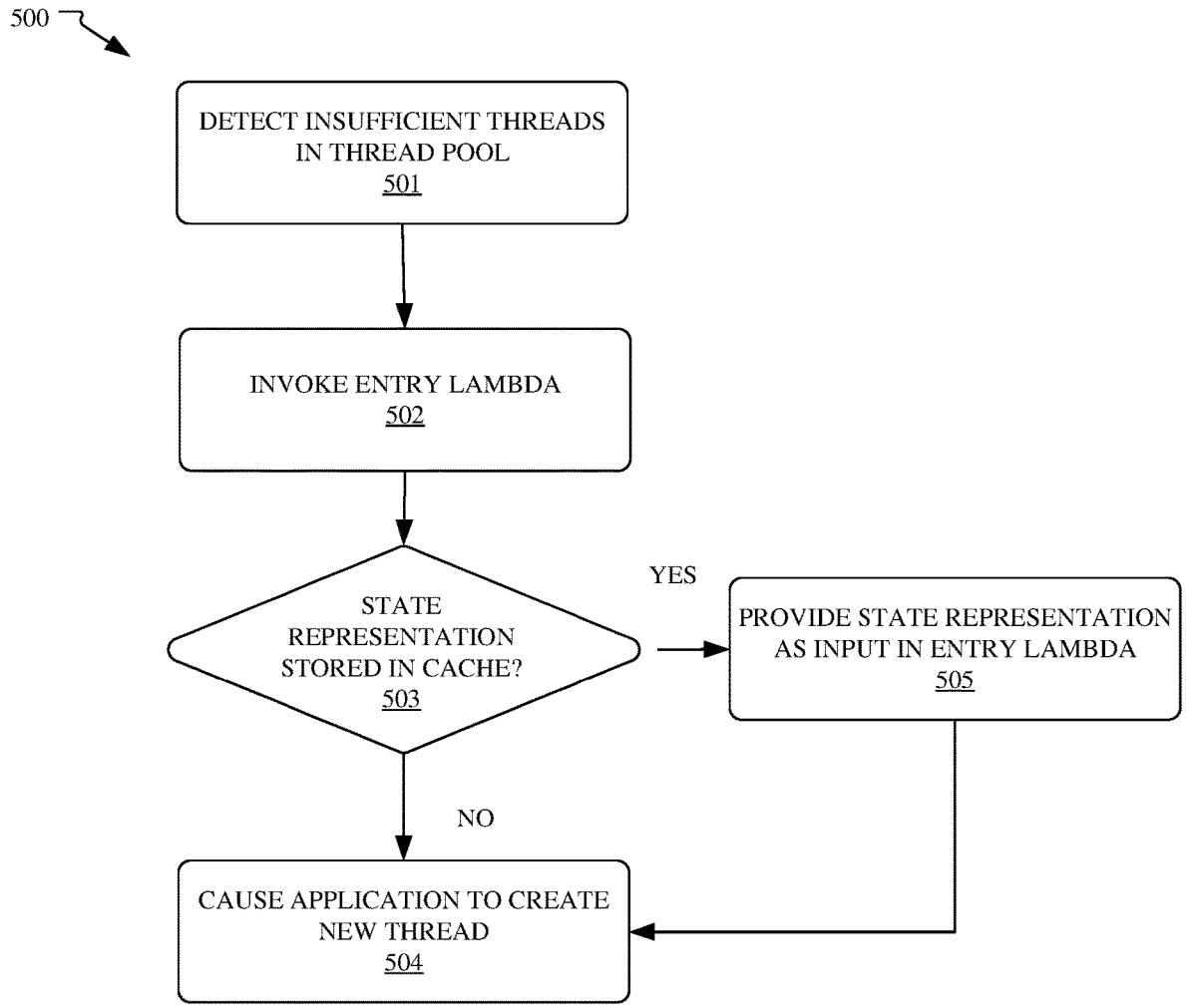
FIG. 5 illustrates a flow diagram of a method 500 for creating a thread for a thread pool, in accordance with embodiments of the present disclosure.

Referring now to FIG. 5, shown is a flow diagram of a method 500 for creating a thread for a thread pool, in accordance with embodiments. In some embodiments, operations of the method 500 may be performed by on a processor of a computer (e.g., computer system 601 of FIG. 6). Further, in some embodiments, the operations of method 300 may be carried out via an underlying runtime environment or a generic service (e.g., TTPM) that is a functionality or aspect of the runtime environment itself (e.g., generic service 220 of FIG. 2).

The method 500 begins at operation 501, wherein the generic service detects insufficient threads in a thread pool. This operation may be the same as, or substantially similar to, operation 304 of FIG. 3. Next, per operation 502, the generic service invokes the applicable entry lambda. Per operation 503, the generic service determines whether there is state representation of the thread to be created stored in its cache (for example, from operation 405 of FIG. 4). If so, then, per operation 505, the generic service provides the state representation as input in the entry lambda. If there is no applicable state representation stored in the cache, or after the state representation is provided as an input to the entry lambda, the application, per operation 504, is caused to create a new thread for the thread pool (using the input state representation, if applicable). In some embodiments, using a stored state representation of a thread to recreate a thread for a pool may take less processor power than was originally required to create the thread (or less processor power than trying to recreate the thread without using the stored state representation).

To further demonstrate embodiments described herein, an example scenario is described. In this example, a generic service is a functionality of a runtime environment which has multiple applications running in it, including application X ("X") and application Y ("Y"). An end user begins to use X. X responds by sending a thread pool management request to the generic service to manage a thread pool for it. X's request is in a standardized format that includes an entry lambda X, an exit lambda X, an indicator that the maximum number tasks that should be awaiting execution in the work queue of X's pool is 6, and another indicator that the maximum number of idle threads in X's pool is 4. The generic service invokes the entry lambda X to cause X to create threads for X's pool and monitors the size of the pool.

To continue the example, while the generic service is monitoring X's pool, another end user begins to use Y. Y responds by sending a thread pool management request to the generic service to manage a thread pool for it. Y's request is in the same standardized format as X's request, but includes an entry lambda Y, an exit lambda Y, an indicator that the maximum number tasks that should be awaiting execution in the work queue of Y's pool is 12, and another indicator that the maximum number of idle threads in Y's pool is 11. The generic service invokes the entry lambda Y to cause Y to create threads for Y's pool and monitors the size of both pools concurrently.

From monitoring X's pool, the generic service detects that there are 7 tasks awaiting execution in X's work queue. The generic service responds by invoking entry lambda X to cause X to increase the number of threads in the pool from 14 to 15 in order to get the number of tasks awaiting execution in X's work queue down to the maximum of 6. Later, the generic service detects that X's work queue is empty and that the 15 threads are idle in X's pool. The generic service responds by placing 11 artificial tasks incorporating exit lambda X into the X's work queue. 11 of the 15 threads then execute one of the artificial tasks, thereby reducing the number of idle threads in X's pool to the maximum of 4.

To further continue the example, the generic service detects that there are 12 idle threads in Y's pool. The generic service responds by placing an artificial task incorporating exit lambda Y into the Y's work queue. One of the 12 idle threads then executes the artificial task, creates a state representation of itself for storage in a cache of the generic service, and terminates, thereby reducing the number of idle threads in Y's pool to the maximum of 11. Later, the generic service detects that there are 13 tasks awaiting execution in Y's work queue. The generic service responds by obtaining the stored state representation from its cache, invoking entry lambda Y (with the stored state representation as an input) to cause Y to increase the number of threads in the pool from 11 to 12 in order to get the number of tasks awaiting execution in Y's work queue down to the maximum of 12.

Some embodiments of the present disclosure may offer various technical computing advantages over other approaches. These computing advantages address problems arising in the realm of efficient thread pool size management.

Figure 6:
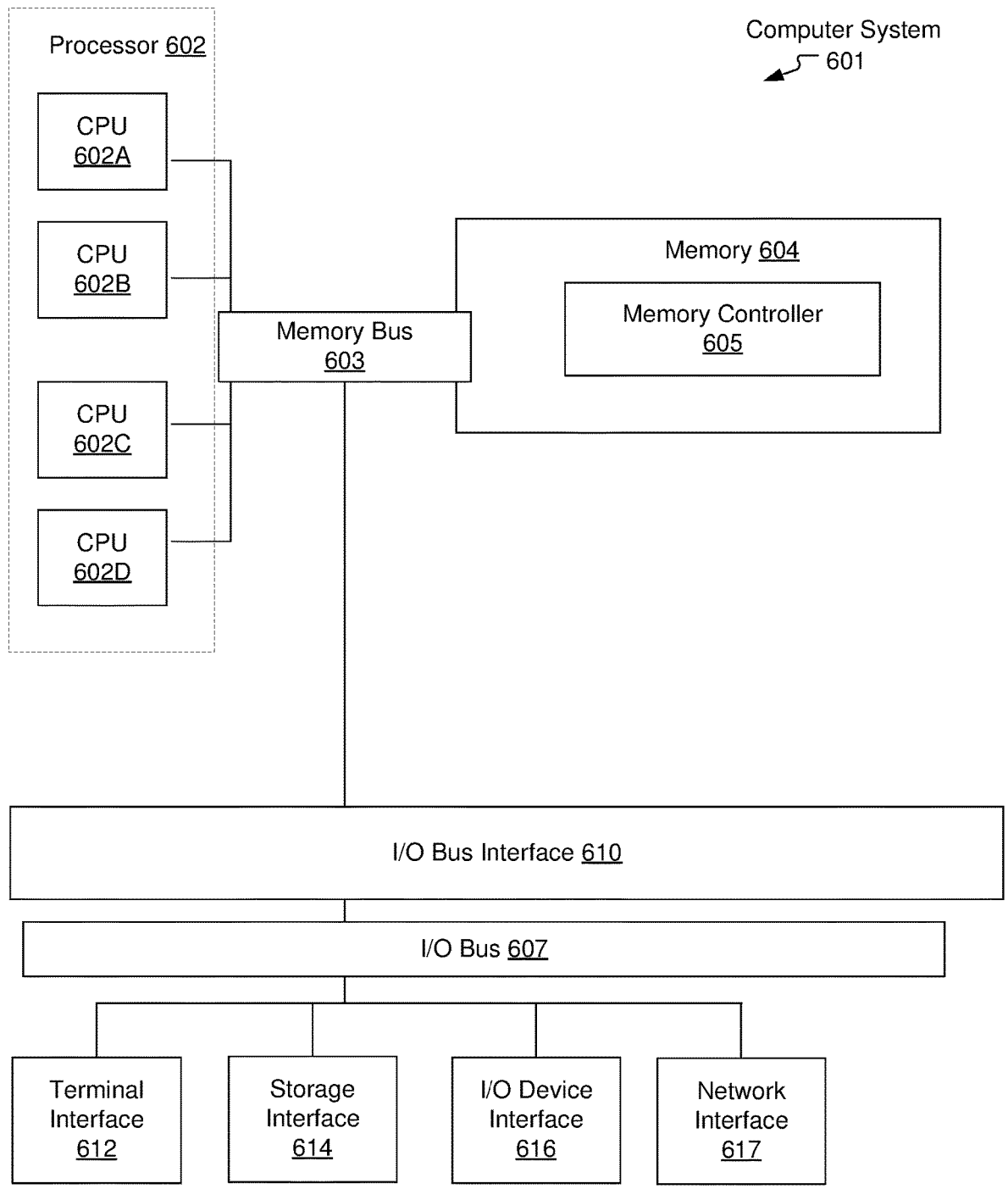
FIG. 6 illustrates a high-level block diagram of an example computer system that may be used in implementing embodiments of the present disclosure.

Referring now to FIG. 6, shown is a high-level block diagram of an example computer system (i.e., computer) 601 that may be used in implementing one or more of the methods or modules, and any related functions or operations, described herein (e.g., using one or more processor circuits or computer processors of the computer), in accordance with embodiments of the present disclosure. In some embodiments, the major components of the computer system 601 may comprise one or more CPUs 602, a memory subsystem 604, a terminal interface 612, a storage interface 614, an I/O (Input/Output) device interface 616, and a network interface 617, all of which may be communicatively coupled, directly or indirectly, for inter-component communication via a memory bus 603, an I/O bus 607, and an I/O bus interface unit 610.

The computer system 601 may contain one or more general-purpose programmable central processing units (CPUs) 602A, 602B, 602C, and 602D, herein generically referred to as the processer 602. In some embodiments, the computer system 601 may contain multiple processors typical of a relatively large system; however, in other embodiments the computer system 601 may alternatively be a single CPU system. Each CPU 602 may execute instructions stored in the memory subsystem 604 and may comprise one or more levels of on-board cache.

In some embodiments, the memory subsystem 604 may comprise a random-access semiconductor memory, storage device, or storage medium (either volatile or non-volatile) for storing data and programs. In some embodiments, the memory subsystem 604 may represent the entire virtual memory of the computer system 601, and may also include the virtual memory of other computer systems coupled to the computer system 601 or connected via a network. The memory subsystem 604 may be conceptually a single monolithic entity, but, in some embodiments, the memory subsystem 604 may be a more complex arrangement, such as a hierarchy of caches and other memory devices. For example, memory may exist in multiple levels of caches, and these caches may be further divided by function, so that one cache holds instructions while another holds non-instruction data, which is used by the processor or processors. In some embodiments, the main memory or memory subsystem 604 may contain elements for control and flow of memory used by the Processor 602. This may include a memory controller 605.

Although the memory bus 603 is shown in FIG. 6 as a single bus structure providing a direct communication path among the CPUs 602, the memory subsystem 604, and the I/O bus interface 610, the memory bus 603 may, in some embodiments, comprise multiple different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface 610 and the I/O bus 607 are shown as single respective units, the computer system 601 may, in some embodiments, contain multiple I/O bus interface units 610, multiple I/O buses 607, or both. Further, while multiple I/O interface units are shown, which separate the I/O bus 607 from various communications paths running to the various I/O devices, in other embodiments some or all of the I/O devices may be connected directly to one or more system I/O buses.

In some embodiments, the computer system 601 may be a multi-user mainframe computer system, a single-user system, or a server computer or similar device that has little or no direct user interface, but receives requests from other computer systems (clients). Further, in some embodiments, the computer system 601 may be implemented as a desktop computer, portable computer, laptop or notebook computer, tablet computer, pocket computer, telephone, smart phone, mobile device, or any other appropriate type of electronic device.

It is noted that FIG. 6 is intended to depict the representative major components of an exemplary computer system 601. In some embodiments, however, individual components may have greater or lesser complexity than as represented in FIG. 6, components other than or in addition to those shown in FIG. 6 may be present, and the number, type, and configuration of such components may vary.

As discussed in more detail herein, it is contemplated that some or all of the operations of some of the embodiments of methods described herein may be performed in alternative orders or may not be performed at all; furthermore, multiple operations may occur at the same time or as an internal part of a larger process.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

As used herein, the term "each" does not necessarily equate to the term "all" as the term "all" is used colloquially. For example, the following two phrases have different meanings: "a car having a plurality of tires, each tire of the plurality of tires being fully inflated" and "a car that has all of its tires fully inflated". The former phrase would encompass a car with three fully-inflated tires (the plurality of tires) and one flat tire (not included in the plurality of tires). The latter phrase would not encompass such a car (because not all of the car's tires are fully inflated). Likewise, the phrase "a computer having a set of files, each file of the set of files being read-only" would encompass a computer having two files, one of which is read-only (and belongs to the set of files) and one of which is not read-only (and does not belong to the set of files).

The descriptions of the various embodiments of the present disclosure have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

Although the present invention has been described in terms of specific embodiments, it is anticipated that alterations and modification thereof will become apparent to the skilled in the art. Therefore, it is intended that the following claims be interpreted as covering all such alterations and modifications as fall within the true spirit and scope of the invention.

What is claimed is:

1. A method for managing execution of varying tasks for a plurality of heterogeneous applications running in a single runtime environment capable of managing thread pools for any of the plurality of applications, the method comprising:

receiving, by the runtime environment, a request to manage a thread pool for one of the applications, wherein the management request includes size thresholds for the thread pool, a first function to be invoked for creation of threads in the thread pool, and a second function to be invoked for termination of the threads in the thread pool;

responsive to detecting, at a first time, that a first of the thread pool size thresholds is not satisfied and that there is not a state representation of an applicable thread in a local cache of the runtime environment, invoking, by the runtime environment, the first function to cause the application to create an additional thread for the thread pool by executing a static block of code that is specific to the application; and responsive to detecting, at a second time subsequent to the first time, that a second of the thread pool size thresholds is not satisfied, placing, by the runtime environment, an artificial task that incorporates the second function into a work queue for the thread pool, whereby a first thread in the thread pool executes the artificial task to invoke the second function and thereby creates a state representation of itself for storage in the local cache and terminates, wherein at each of multiple times subsequent to the second time that the first threshold is detected as being not satisfied, the same state representation of the first thread is provided from the local cache as an input to the first function by the runtime environment such that multiple additional threads are created for the thread pool by the runtime environment without needing to execute the static block of code.

2. The method of claim 1, further comprising:

exposing, to the plurality of applications and via an application programming interface (API), a generic service of the runtime environment, wherein the generic service is the runtime environment's thread pool management capability, and wherein the request to manage the thread pool for the application is received via the API.

3. The method of claim 2, wherein the request to manage the thread pool includes a count field as an attribute such that the generic service does not need to enumerate over tasks in the work queue to obtain a task count.

4. The method of claim 2, wherein the generic service includes a sampler configured to start up at regular intervals to count the number of active and inactive threads in the thread pool and to compare the count of the number of inactive threads to the second threshold to determine whether the second threshold is satisfied.

5. The method of claim 2, wherein the generic service includes a sampler configured to start up at regular intervals to count the number of tasks in the work queue and to compare the count of the number of tasks to the first threshold to determine whether the first threshold is satisfied.

6. The method of claim 1, wherein the multiple additional threads created from the same state representation of the first thread execute tasks in the thread pool at a same time.

7. The method of claim 1, wherein the state representation of the first thread as stored in the local cache includes class loader information.

8. The method of claim 1, wherein the state representation of the first thread as stored in the local cache includes CPU affinity.

9. The method of claim 1, wherein the runtime environment is a virtual machine, and wherein the plurality of applications are middleware applications.

10. The method of claim 1, wherein the first function is a lambda that references thread creation code specific to context of the application, and wherein the second function is a second lambda that references thread termination code specific to the context of the application.

11. The method of claim 1, further comprising:

receiving, by the runtime environment and while the runtime environment is managing the thread pool, a second request to manage a second thread pool for a second one of the applications, wherein the second management request includes a second set of size thresholds for the second thread pool, a third function to be invoked for creation of threads in the second thread pool, and a fourth function to be invoked for destruction of the threads in the second thread pool;

responsive to detecting that a first of the second set of thread pool size thresholds is not satisfied, invoking, by the runtime environment, the third function to cause the second application to create an additional thread for the second thread pool; and responsive to detecting that a second of the second set of thread pool size thresholds is not satisfied, placing, by the runtime environment, a second artificial task that incorporates the fourth function into a work queue for the second thread pool, whereby a thread in the second thread pool executes the second artificial task to invoke the fourth function and thereby terminates.

12. The method of claim 11, wherein the second function and the fourth function are contextual functions specific to contexts of the application and the second application, respectively, such that the second and fourth functions are not the same or interchangeable.

13. A computer program product for managing execution of varying tasks for a plurality of heterogeneous applications running in a single runtime environment capable of managing thread pools for any of the plurality of applications, the computer program product comprising a computer readable storage medium, the computer readable storage medium having program instructions embodied therewith, the programs instructions configured, when executed by at least one computer, to cause the at least one computer to perform a method comprising:

receiving, by the runtime environment, a request to manage a thread pool for one of the applications, wherein the management request includes size thresholds for the thread pool, a first function to be invoked for creation of threads in the thread pool, and a second function to be invoked for termination of the threads in the thread pool;

responsive to detecting, at a first time, that a first of the thread pool size thresholds is not satisfied and that there is not a state representation of an applicable thread in a local cache of the runtime environment, invoking, by the runtime environment, the first function to cause the application to create an additional thread for the thread pool by executing a static block of code that is specific to the application; and responsive to detecting, at a second time subsequent to the first time, that a second of the thread pool size thresholds is not satisfied, placing, by the runtime environment, an artificial task that incorporates the second function into a work queue for the thread pool, whereby a first thread in the thread pool executes the artificial task to invoke the second function and thereby creates a state representation of itself for storage in the local cache and terminates, wherein at each of multiple times subsequent to the second time that the first threshold is detected as being not satisfied, the same state representation of the first thread is provided from the local cache as an input to the first function by the runtime environment such that multiple additional threads are created for the thread pool by the runtime environment without needing to execute the static block of code.

14. The computer program product of claim 13, wherein the method further comprises:

exposing, to the plurality of applications and via an application programming interface (API), a generic service of the runtime environment, wherein the generic service is the runtime environment's thread pool management capability, and wherein the request to manage the thread pool for the application is received via the API.

15. The computer program product of claim 13, wherein the runtime environment is a virtual machine, and wherein the plurality of applications are middleware applications.

16. The computer program product of claim 13, wherein the first function is a lambda that references thread creation code specific to context of the application, and wherein the second function is a second lambda that references thread termination code specific to the context of the application.

17. The computer program product of claim 13, wherein the method further comprises:
receiving, by the runtime environment and while the runtime environment is managing the thread pool, a second request to manage a second thread pool for a second one of the applications, wherein the second management request includes a second set of size thresholds for the second thread pool, a third function to be invoked for creation of threads in the second thread pool, and a fourth function to be invoked for destruction of the threads in the second thread pool;
responsive to detecting that a first of the second set of thread pool size thresholds is not satisfied, invoking, by the runtime environment, the third function to cause the second application to create an additional thread for the second thread pool; and
responsive to detecting that a second of the second set of thread pool size thresholds is not satisfied, placing, by the runtime environment, a second artificial task that incorporates the fourth function into a work queue for the second thread pool, whereby a thread in the second thread pool executes the second artificial task to invoke the fourth function and thereby terminates.

18. The computer program product of claim 17, wherein the second function and the fourth function are contextual functions specific to contexts of the application and the second application, respectively, such that the second and fourth functions are not the same or interchangeable.

19. A system for managing execution of varying tasks for a plurality of heterogeneous applications running in a single runtime environment capable of managing thread pools for any of the plurality of applications, the system comprising:
a computer readable storage medium; and
a processor in communication with the computer readable storage medium, the processor configured to obtain instructions from the computer readable storage medium that cause the processor to perform a method comprising:
receiving, by the runtime environment, a request to manage a thread pool for one of the applications, wherein the management request includes size thresholds for the thread pool, a first function to be invoked for creation of threads in the thread pool, and a second function to be invoked for termination of the threads in the thread pool;
responsive to detecting, at a first time, that a first of the thread pool size thresholds is not satisfied and that there is not a state representation of an applicable thread in a local cache of the runtime environment, invoking, by the runtime environment, the first function to cause the application to create an additional thread for the thread pool by executing a static block of code that is specific to the application; and
responsive to detecting, at a second time subsequent to the first time, that a second of the thread pool size thresholds is not satisfied, placing, by the runtime environment, an artificial task that incorporates the second function into a work queue for the thread pool, whereby a first thread in the thread pool executes the artificial task to invoke the second function and thereby creates a state representation of itself for storage in the local cache and terminates,
wherein at each of multiple times subsequent to the second time that the first threshold is detected as being not satisfied, the same state representation of the first thread is provided from the local cache as an input to the first function by the runtime environment such that multiple additional threads are created for the thread pool by the runtime environment without needing to execute the static block of code.

20. The system of claim 19, wherein the method further comprises:
exposing, to the plurality of applications and via an application programming interface (API), a generic service of the runtime environment, wherein the generic service is the runtime environment's thread pool management capability, and wherein the request to manage the thread pool for the application is received via the API.

* * * * *